United States Patent [19]

Meyerand, Jr. et al.

[11] Patent Number: 4,481,456

[45] Date of Patent: Nov. 6, 1984

[54] MICROPROCESSOR CONTROLLED MULTIFREQUENCY AC CONVERTER

[75] Inventors: Russell G. Meyerand, Jr., Glastonbury; Louis L. Daigle; Donald C. Paine, both of Manchester, all of Conn.

[73] Assignee: United Technologies Corporation, Hartford, Conn.

[21] Appl. No.: 460,526

[22] Filed: Jan. 24, 1983

Related U.S. Application Data

[63] Continuation-in-part of Ser. No. 308,634, Oct. 5, 1981, abandoned.

[51] Int. Cl.³ ............................................. H07P 5/40
[52] U.S. Cl. .................................... 318/800; 318/801
[58] Field of Search .................... 318/729, 720–724, 318/772, 773, 800–811, 345 E, 798, 799, 700

[56] References Cited

U.S. PATENT DOCUMENTS

| | | | |
|---|---|---|---|
| 3,703,672 | 11/1972 | Bird et al. | 318/809 |
| 3,946,293 | 3/1976 | Feld | 318/799 |
| 4,078,393 | 3/1978 | Wills | 318/804 |
| 4,090,116 | 5/1978 | Lippitt | 318/345 E |
| 4,125,796 | 11/1978 | Nagase et al. | 318/700 |
| 4,176,306 | 11/1979 | Asano et al. | 318/772 |
| 4,259,630 | 3/1981 | Killian | 318/807 |
| 4,384,243 | 5/1983 | Muskovac | 318/798 |

OTHER PUBLICATIONS

Athani et al., "Microprocessor Control of a Three-Phase Inverter in Induction Motor Speed Control System" IEEE Transactions on Industrial Electronics and Control Instrumentation, vol. IECI-27, No. 4, Nov. 1980.

*Primary Examiner*—E. A. Goldberg
*Assistant Examiner*—Arthur G. Evans
*Attorney, Agent, or Firm*—Richard P. Lange; Robert P. Sabath

[57] ABSTRACT

An AC converter changes the frequency of an incoming voltage waveform to operate an induction motor driving a ventilation system at one or several different speeds. A program followed by a microprocessor utilizes the phase-to-phase incoming voltage waveform in a step-by-step sequence to generate control signals for the switches in a switching matrix. A full-speed subroutine, a three-quarter speed subroutine and a half-speed subroutine are disclosed for the microprocessor.

7 Claims, 6 Drawing Figures

*FIG. 3*
3/4 SPEED
SUBROUTINE

FIG. 5
1/2 SPEED SUBROUTINE

FIG. 6
30 HERTZ

MICROPROCESSOR CONTROLLED MULTIFREQUENCY AC CONVERTER

This is a continuation-in-part application of U.S. patent application Ser. No. 308,634, filed Oct. 5, 1981, now abandoned.

DESCRIPTION

Technical Field

This invention relates to a circuit for operating an AC induction motor at multiple speeds and, more specifically, to a microprocessor controlled AC converter for directly changing 60 hertz line power to either 45 hertz or 30 hertz to operate the induction motors of an air-conditioning system at three-quarter or one-half speed thereby significantly reducing consumed power.

Background Art

Induction motors are generally known and have been used for many years in ventilating and air-conditioning systems to drive fans, or the like, that circulate air. Most often the size of a fan motor in an air-conditioning system is selected by matching it to the maximum amount of air which must be moved in a given unit of time to achieve the necessary cooling of a building. This approach is particularly wasteful of electrical energy in that the maximum cooling for a building is only required a small percentage of the time, e.g., on the hottest days of the year. Therefore, most of the time the air-conditioning system could maintain a comfortable temperature level in a building with a lower flow of air. As is well known, a considerable savings in electrical energy will result where the air-conditioning system can be operated at lower air-flows. However, for maximum versatility, it is quite desirable that the ventilation system can be quickly and conveniently switched to provide various amounts of airflow depending on the requirement at any one time for cool air within the building.

Probably the best known way to reduce the amount of electrical energy consumed by an induction motor is to turn that motor off. Automatic timing systems and similar devices, are one well known way for cycling an induction motor between the off and on state. In other words, this duty cycle modulation of the air-conditioning system means that in a given period of time the system is operating at full capacity and then is turned off for a certain time period. This approach has proven to be unsatisfactory in many situations, particularly where the air-conditioning and the ventilating system in a building operate through common air ducts. First, duty cycle operation of a ventilation fan in any one area of a particular building often causes unacceptably wide temperature variations between various areas in the building. Secondly, the off/on cycling of the ventilation fan tends to create uncomfortable drafts. Because there is often a noise level associated with a ventilation system due to the movement of the air through the duct, motor and fan noise, etc., the off/on cycling of the ventilation system can cause a variation in the background noise level which is disconcerting to the building occupants. Finally, and most important from an energy conservation viewpoint, is that the system losses in a ventilating system, airflow losses, motor losses, etc., are greatest when the system is operating at its maximum rated capacity, i.e., at maximum airflow. Thus, a significant reduction in system losses occurs if the volume of air moving through the ventilation system at any one time can be reduced.

Numerous attempts have been made to create an economically feasible method to operate an AC induction motor at more than one speed. One method has been to purchase a motor for the ventilation fan that includes multiple windings on the stator portion of the motor. One winding is then energized to operate at a particular speed and another winding is energized for a lower speed. Because this system required a separate winding for each speed, the cost of utilizing multiple winding motors in an HVAC, particularly one which includes a large number of separate ventilators, can be considerable.

Another approach to multiple speed operation for the fans of a ventilation system has been to use a separate motor for each speed, a high speed motor and a low speed motor. During the time when the higher airflow through the ventilation system is needed, the high speed motor would be coupled to each fan through a mechanical belt drive system, or the like. When the airflow requirement can be lowered, the lower speed motor is then coupled to the fan through the belt drive system. As is apparent, this technique requires the expense of two separate motors for each fan in addition to a belt drive system, or other mechanically switchable couplers, which must be capable of allowing the motors to be alternatively coupled to the fan.

Yet another approach for reducing the speed of an AC induction motor coupled to a ventilating fan is to use a rectifier-inverter circuit. The rectifier circuit converts the incoming AC electrical energy to DC electrical energy. The inverter, which includes a suitable control circuit, then transforms the DC electrical energy back into AC electrical energy of a desired frequency for operating the induction motor at the selected speed. This approach also tends to be expensive due to the cost associated with the rectifier and the inverter.

Another approach to changing the speed of an AC induction motor is to directly change the frequency of the incoming AC electrical energy to a lower frequency so that the induction motor will operate at a lower speed. In this regard, U.S. Pat. No. 3,710,218 issued July 9, 1973 to C. Roundy et al for INDUCTION MOTOR SPEED CONTROL describes a circuit used with an AC induction motor to control the frequency of the voltage waveform applied to the stator. One embodiment for a single-phase motor, illustrated in FIG. 3 of the patent disclosure, shows a circuit which utilizes a standard 60 hertz input power waveform to drive an induction motor at half speed. The control circuitry causes the circuit to skip the second, fourth, eighth, etc., pulse, past the first, fifth, ninth, etc., pulse and inverts the third, seventh and eleventh pulse to create a resemblance of a 30 hertz waveform.

Also of particular interest is U.S. patent application Ser. No. 095,768 filed Nov. 19, 1979 by L. Daigle, D. Paine and A. Bednarczyk for HALF-FREQUENCY AC CONVERTER, this case being commonly assigned. The circuit disclosed therein is for use with a three-phase induction motor to drive the ventilating fan at half-speed. A center-tap power transformer is used to lower the magnitude of the incoming voltage waveform and a number of thyristor switches are connected between the transformer secondary and the induction motor. A synchronizing circuit senses the zero crossings of the incoming voltage waveforms. The control circuit generates pulses that are related to the zero crossings of the incoming voltage waveform and supplies the same to a first group of thyristors for one-half cycle and then a second group of thyristors for the second-half cycle. The dedicated circuit design in this disclosure could only operate the fan motor at either full speed or half speed and would be more expensive to manufacture than the microprocessor design of the present invention.

Disclosure of the Invention

The present invention relates to a microprocessor controlled multifrequency circuit configuration for reducing the power consumed by an AC induction motor driving ventilation fans, or the like, by converting the frequency of the input voltage waveforms to one of two lower frequencies thereby causing the induction motor to operate at one of two lower speeds.

A particular feature of the microprocessor controlled multifrequency converter according to the present invention is that one, or more, AC induction motors that operate the fans in an HVAC system can be quickly switched to any one of a number of preselected speeds to save energy when less airflow is needed by the HVAC system.

Another feature of the microprocessor controlled multifrequency AC converter of the present invention is that it utilizes a microprocessor to generate the gate control signals for the switching matrix driving ventilation fans. The microprocessor easily interacts with a building management system which may control the entire building environment, including the heating, ventilating, and air-conditioning systems so that the motor speed can be varied as one part of a building management program.

According to an aspect of the present invention, a microprocessor controlled multifrequency AC converter effectively reduces electrical energy consumed by an HVAC system by allowing the economical operation of ventilation drive motors through operation at lower speeds. Since lower speed operation of the ventilation drive motor is acceptable most of the time, i.e., other than for peak cooling periods, considerable electrical power savings can be realized.

According to yet another feature of the microprocessor controlled multifrequency converter of the present invention, precise timing of the gating signals applied to the thyristors in accordance with the control algorithm in the microprocessor eliminates the need for power transformers in the system. The correct motor excitation as a function of operation speed, i.e., full speed, three-quarter, speed or half speed is applied to the motor through the switches controlled by the microprocessor.

According to the microprocessor controlled multifrequency converter of the present invention, a back-to-back pair of thyristors are coupled between each phase of a three-phase power supply and each separate terminal of the three-phase induction motor. Voltage sensors detect the voltage waveform on each input line. Then a voltage comparator senses when a phase-to-phase voltage crosses through zero volts. The microprocessor then calculates the precise firing time in accordance with a predetermined software routine. Finally, the microprocessor provides a gate control signal through a latch circuit to the control terminal of a predetermined thyristor in a switching matrix.

The foregoing and other objects, features and advantages of the present invention will become more apparent from the following description of preferred embodiments and accompanying drawings.

Best Mode for Carrying Out the Invention

Figure 1:
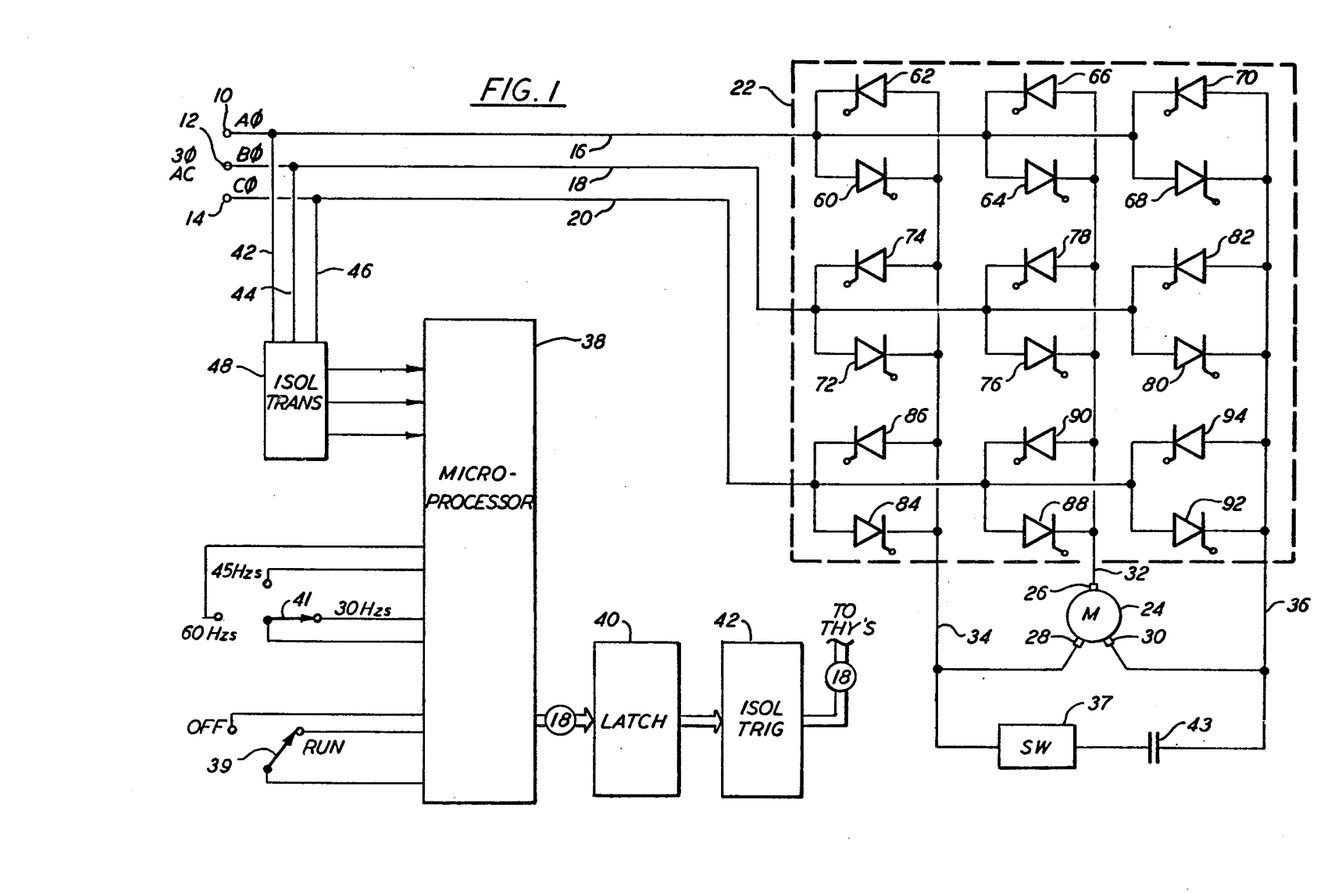
FIG. 1 is a schematic block diagram of a microprocessor controlled multifrequency AC converter according to the present invention.

Referring initially to FIG. 1, there is seen one embodiment of the microprocessor controlled multifrequency converter according to the present invention for operating one, or more, AC induction motors at different speeds, thereby significantly reducing consumed electrical power. An input terminal 10, an input terminal 12, and an input terminal 14 are connected to an AC three-phase power source (not shown), one typical power source being a conventional utility power grid which provides three-phase electric power A$\phi$, B$\phi$, C$\phi$, at a frequency of 60 hertz. A lead 16, a lead 18, and a lead 20 connect the input terminals 10, 12 and 14, respectively, to a switching matrix 22; the operation of the switching matrix 22 will be described in greater detail hereinafter. Finally, a three-phase motor 24 for the ventilation fans (not shown) of the HVAC system includes input terminals 26, 28 and 30 which are connected to the output of the switching matrix 22 by a line 32, a line 34 and a line 36. Although only one motor 24 is shown in the drawing, it should be understood that in a conventional HVAC system there are normally a number of motors which are positioned at various locations in a building and the microprocessor controlled multifrequency converter of the present invention could be used to simultaneously control all such motors at a common selected frequency. In such event, the overall power handling capability of the converter must be matched to the combined power requirements of all of the motors in the system.

A particular feature of the present invention involves the use of a microprocessor to calculate the exact switching points for enabling the switches, such as thyristors in the switching matrix 22. The phases of the incoming voltage waveforms are used as reference points and the phase of each waveform is detected by a sensing circuit which includes a line 42, a line 44, and a line 46 which are connected to the input terminals 10, 12 and 14, respectively. An isolation transformer 48 is connected in the lines 42, 44 and 46 to isolate the high voltage of the power source from the lower voltage circuits at the inputs to the microprocessor 38. At the output of the microprocessor 38 a latch circuit 40 of conventional design is provided to insure a clean enabled signal to each of the elements in the switching matrix 22. An isolation trigger circuit 42 must also be coupled to the output ports of the microprocessor 38 to provide electrical isolation between the high voltage at each switching element and the lower voltage microprocessor output circuitry.

The invention includes switching matrix 22 which is connected between the three-phase source of electrical power and the one or more motors 24 driving the fans in the HVAC system. The switching matrix 22 is comprised of a number of solid state switches, having a current capacity matched to the requirement of the one or more motors 24. The switches may be thyristors which are connected in a back-to-back configuration between each phase of the AC power source and each input terminal of the motor 24. For example, a thyristor 60 and a thyristor 62 have their anode and cathode, respectively, connected to the lead 16 and the input terminal 10, A$\phi$, of the external power source while the other side of each thyristor is connected by the lead 34 to the terminal 28 of motor 24. A thyristor 64 and a thyristor 66 have their anode and cathode, respectively, connected to the lead 16 and the terminal 10, A$\phi$, of the three-phase power source while the opposite side of each thyristor is connected to the lead 32 and the terminal 26 of the motor 24. A thyristor 68 and a thyristor 70 have their anode and cathode, respectively, connected to the lead 16 and the input terminal 10, A$\phi$, of the three-phase power source while the opposite side of each thyristor is connected by the lead 36 to the terminal 30 of the motor 24. A thyristor 72 and a thyristor 74 have their anode and cathode, respectively, connected by the lead 18 to the terminal 12, B$\phi$, of the three-phase power source while the opposite side of each thyristor is connected by the lead 34 to the terminal 28 of the motor 24. A thyristor 76 and a thyristor 78 have their anode and cathode, respectively, connected by the lead 18 to the terminal 12, B$\phi$, of the three-phase power source while the opposite side of each thyristor is connected by the lead 32 to the terminal 26 of the motor 24. A thyristor 80 and a thyristor 82 have their anode and cathode, respectively, connected to the lead 18 and the terminal 12, B$\phi$, of the three-phase power source while the opposite side of each thyristor is connected by the lead 36 to the terminal 30 of the motor 24. A thyristor 84 and a thyristor 86 have their anode and cathode, respectively, connected by the lead 20 to the terminal 14, C$\phi$, of the three-phase power source while the opposite side of each thyristor is connected by the lead 34 to the terminal 28 of the motor 24. A thyristor 88 and a thyristor 90 have their anode and cathode, respectively, connected by the lead 20 to the terminal 14, C$\phi$, of the three-phase power source while the opposite side of each thyristor is connected by the lead 32 to the terminal 26 of the motor 24. Finally, a thyristor 92 and a thyristor 94 have their anode and cathode, respectively, connected by the lead 20 to the terminal 14, C$\phi$, of the three-phase power source while the opposite side of each thyristor is connected by the lead 36 to the terminal 30 of the motor 24.

Figure 2:
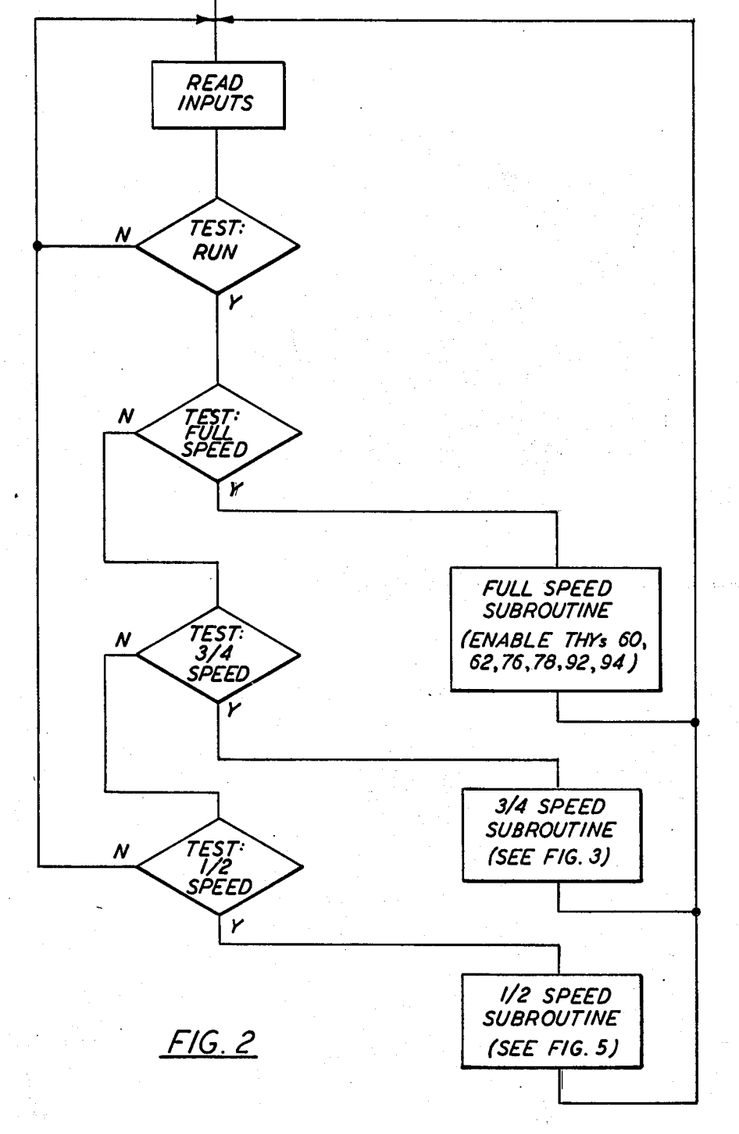
FIG. 2 is a logic flow chart of the initializing program for the embodiment of FIG. 1.

One of the more prominent features of the present invention is that the microprocessor 38 calculates the precise firing times for each of the thyristors in the switching matrix 22 in accordance with a program that is designed to insure that each thyristor is enabled at precisely the correct time. This program is designed to turn ON the correct thyristors at the correct time to provide the desired output waveform having the appropriate frequency components. Referring now to FIG. 2, there is seen a flow chart for the program of the microprocessor 38 during which the frequency select cycle determines the subroutine related to the selected operating speed of the motor. When the input power is applied, the microprocessor first checks to see if a switch 39 is in the run mode. If so, a series of tests will be performed to identify the position of switch 41. In the program sequence, the microprocessor 38 checks the switch 41 to determine if the full speed subroutine 110, the three-quarter speed subroutine 112, or the half-speed subroutine 114 is to be performed.

The microprocessor operation running in the full-speed mode will now be described. In this mode, a separate pathway for each phase is provided through the switching matrix. For example, the thyristors 60, 62 can be enabled, providing a bidirectional path through the switching matrix 22 between the input terminal 10 and the terminal 28 of the motor 24. The thyristors 76, 78 can be enabled to connect the B$\phi$ of the three-phase power source through the switching matrix 22 to the terminal 26 of the motor 24. The thyristors 92 and 94 can be enabled, connecting C$\phi$ of the external power source through the switching matrix to the terminal 30 of the motor 24. These thyristors are then left in the ON state so long as the microprocessor 38 is running in this full-speed mode.

Figure 3:
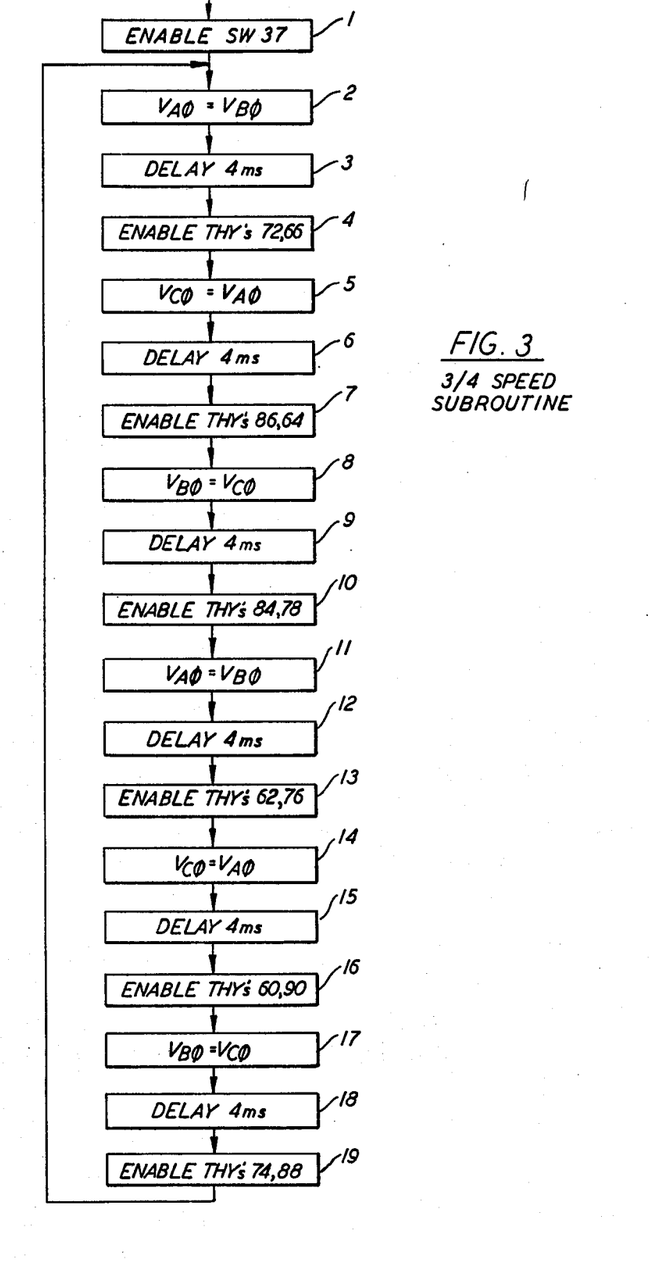
FIG. 3 is a logic flow chart for the single phase, three-quarter speed program shown in FIG. 2.
Figure 4:
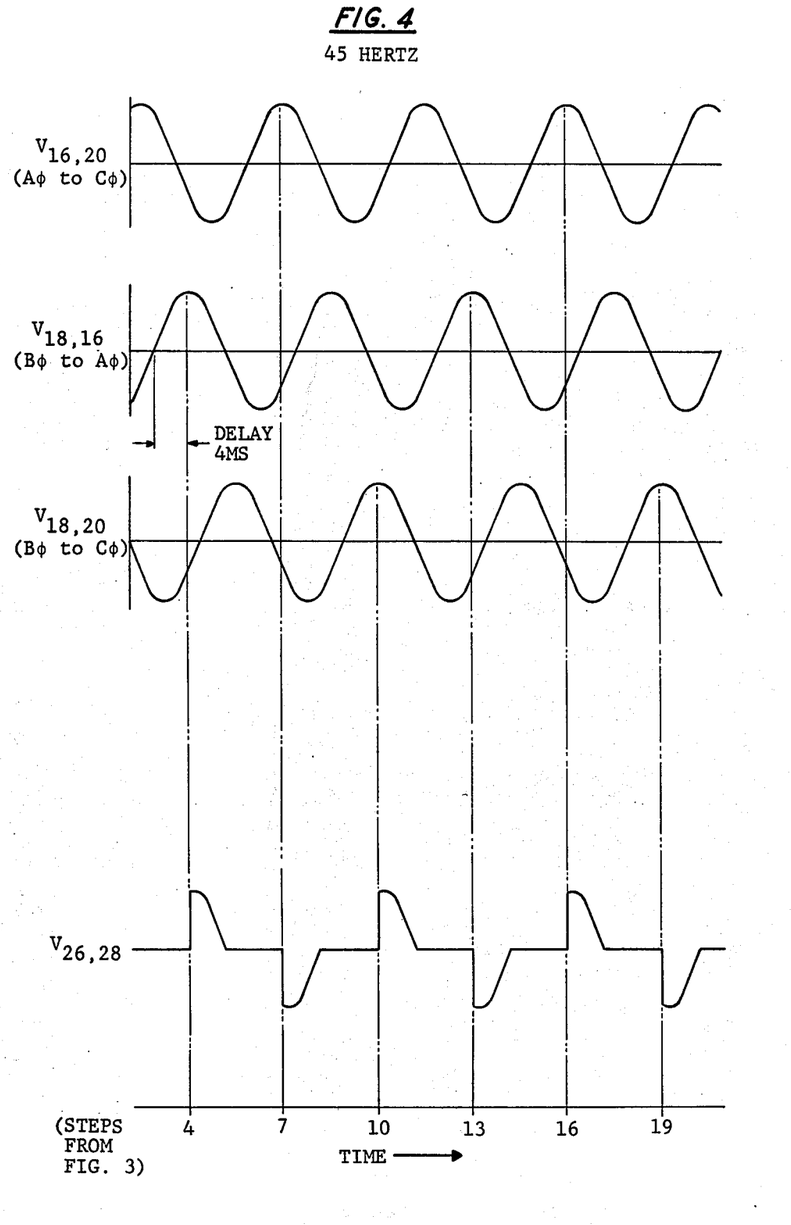
FIG. 4 is a drawing depicting the converter input voltage waveform and the converter output voltage waveform.

In FIG. 3, there is seen a flow chart of the subroutine for the microprocessor 38 which operates the motor 24 at three-quarters of its rated speed to produce the waveform seen in FIG. 4. In performing this subroutine, the microprocessor 38 essentially utilizes the phases of the voltage waveforms from the three-phase AC power source as a reference point. Then, after a predetermined delay period, e.g., 4 milliseconds, certain ones of the switches in the switching matrix 22 are enabled in a predetermined sequence. After the three-quarter speed subroutine has been selected by the microprocessor 38, the first step involves outputting an enable signal to the switch 37 transitioning it to the ON state. The switch 37 then remains in the ON state so long as the microprocessor is in the three-quarter speed mode. The three-phase motor 24 is essentially operated from a single-phase source and a capacitor 43 is used to shift the phase of the voltage waveform applied to the third terminal. In the second step, the phase of the voltage waveform on the line 16, $V_{A\phi}$, is compared with the phase of the voltage waveform on the line 18, B$\phi$, to determine equality, or the point at which the two amplitudes are equal. After a delay of 4 milliseconds (Step 3) an enable signal is provided to the thyristors 72 and 66 (Step 4) connecting line 18 and the line 16 with the terminals 28 and 26, respectively, on motor 24. As the microprocessor continues this subroutine, this procedure is repeated so that the other thyristors in the switching matrix 22 are enabled as shown in Steps 5-19. After Step 19, the program loops back to run test, full speed test select, three-quarter speed test select, and then the three-quarter speed subroutine is again sequenced in a step-by-step sequence as shown. The voltage waveform applied to the motor 24 at each step of the program can be observed in FIG. 4.

Figure 5:
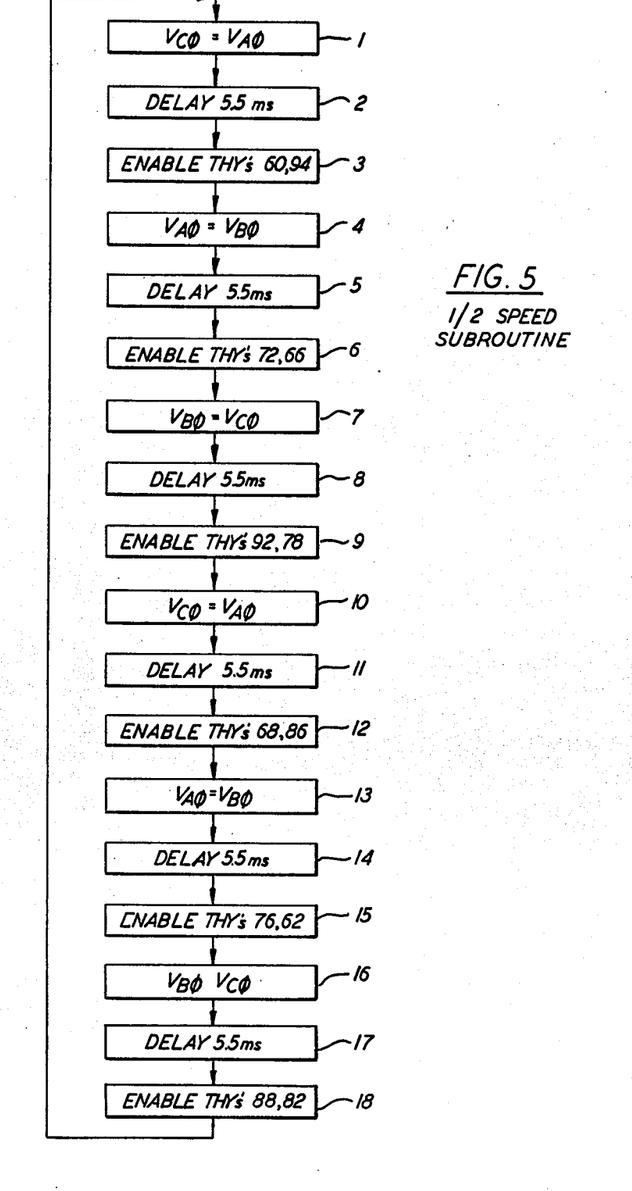
FIG. 5 is a logic flow chart of the one-half speed program for the embodiment of FIG. 1.
Figure 6:
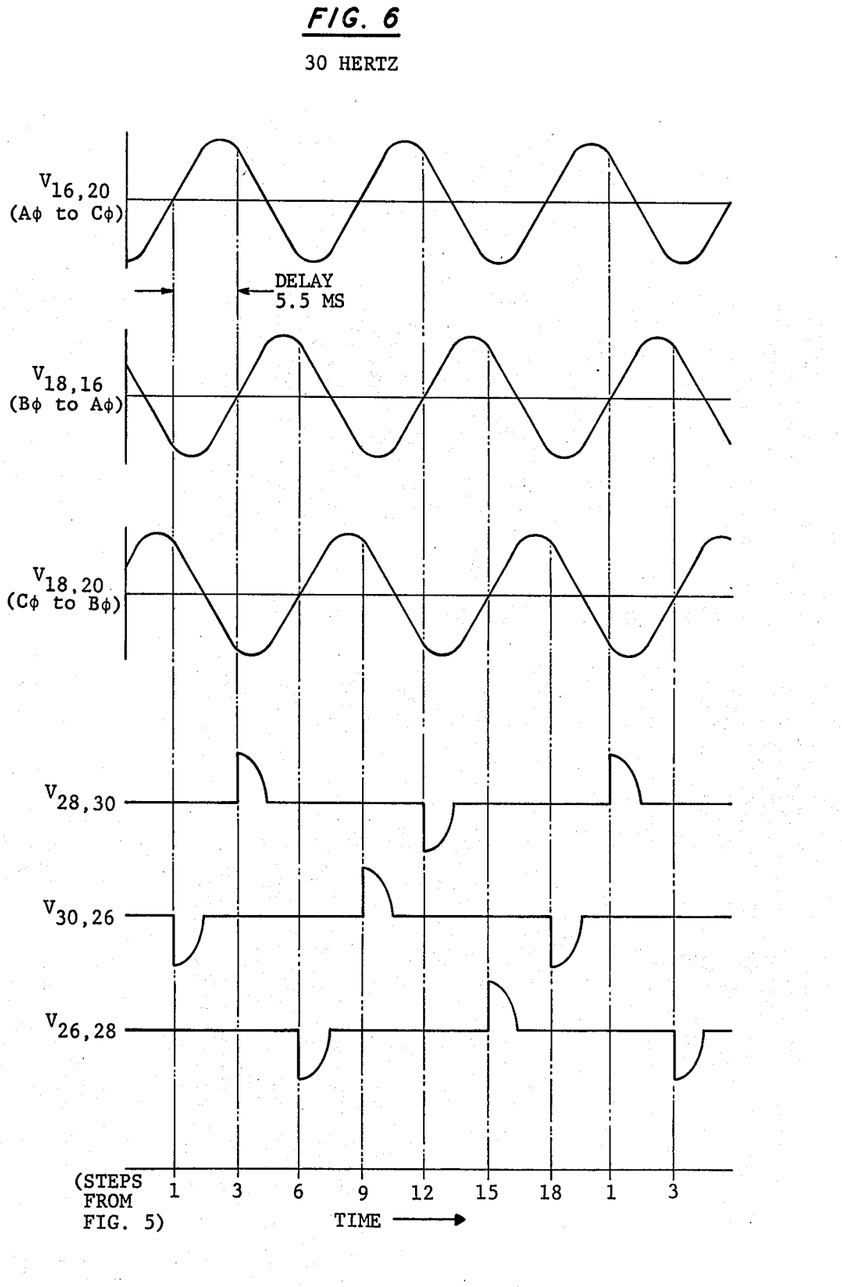
FIG. 6 is a drawing depicting the converter input voltage waveforms and the converter output voltage waveforms resulting from the subroutine of FIG. 5.

Referring now to FIG. 5, there is seen a flow chart of the subroutine followed by the microprocessor 38 to operate the motor 24 during its one-half speed mode to produce the waveform shown in FIG. 6. In this subroutine, the microprocessor 38 also utilizes the phases of the three-phase AC power source as a reference point and after a predetermined delay of approximately 5.5 milliseconds enables all the thyristors in the switching matrix 22 in a predetermined sequence. For example, the first step of the program involves comparing the voltage level on the line 20, Cϕ, with the voltage level on the line 16, Aϕ, determine equality. This voltage equality test assures the correct thyristor gating sequence for the selected effective frequency. Then, after a delay of 5.5 milliseconds (Step 2), the microprocessor 38 presents an enable signal to the thyristors 60 and 94 (Step 3). Next, the phase of the voltage waveforms on the lines 16 and 18 are checked until equality is measured (Step 4) and, after a delay of 5.5 milliseconds (Step 5) the thyristors 72 and 66 are enabled. As the microprocessor continues this subroutine, the remaining Steps 7-18 are performed and the indicated thyristors are enabled as shown until, at the end of the routine (Step 18) the last two thyristors, 88 and 82, are enabled. The final step of the program is a loop back run test, full speed test select, three-quarter speed test select, half-speed test select and then to the beginning of the half-speed subroutine where the phase of the voltage waveforms on the lines 16 and 20, $V_{A\phi}$ and $V_{B\phi}$ (Step 1), are tested for equality. The half-speed subroutine is repeated so long as the speed select switch remains in the half-speed mode. The voltage waveform applied to the motor 24 during this one-half speed mode can be observed in FIG. 6.

It should be understood that the microprocessor controlled multifrequency AC converter of the present invention could be modified for operating a motor at other speeds. In this case, the speeds were full speed, three-quarter speed or half speed, and were selected because the motor is driving air in a ventilation system. This speed range is normally quite suitable for the particular use in that many different speeds are not needed. However, in cases where the motor is to operate other devices, more speeds or different speeds may be needed. The program for the microprocessor can easily be augmented with supplemental subroutines to handle these different speed requirements.

Although this invention has been shown and described with respect to a preferred embodiment, it will be understood by those skilled in this art that various changes in form and detail thereof may be made without departing from the spirit and scope of the claimed invention.

We claim:

1. A converter for transforming a three-phase, sinusoidal waveform of a first frequency directly to a lower frequency waveform having a substantially sinusoidal characteristic for operating an AC motor comprising:

input means from a source of electrical energy, for receiving electrical power having a plurality of phases;

switching means including a matrix having a plurality of switching elements connected between said source of electrical energy and said motor;

sensing means for monitoring the phase of the voltage waveforms from said source of electrical energy;

processing means for selectively operating said motor in a number of different speed modes, said processing means following a step-by-step program sequence to determine equality between selected phases of said three-phase sinusoidal waveform, and to generate control signals that enable each of said switching elements of said switching means at a predetermined time and in a particular sequence; and whereby said converter presents said lower frequency waveform to said motor allowing operation at either full speed, three-quarter speed or half speed.

2. A converter according to claim 1, wherein said input menas receives electrical energy from a three-phase source, and wherein said processing means follows a program that utilizes the amplitudes of the incoming voltage waveform as a reference point to provide enable signals to said switching means.

3. A converter according to claim 1, wherein the processing means follows a step-by-step program enabling selected ones of said plurality of switching elements in said switching means to operate said motor at either full speed, three-quarter speed or half speed.

4. A converter according to claim 1, wherein said switching means includes a plurality of thyristors connected between said input means and said motor, and wherein each of said thyristors includes a control terminal through which said thyristors can be enabled by presentation of a suitable control signal, and wherein said processing means includes a plurality of output ports, one of which is connected to each of said gate terminals, and wherein said processing means follows either a full-speed subroutine, a three-quarter speed subroutine or a half-speed subroutine to enable three selected ones of said thyristors.

5. A converter according to claim 1, wherein said processing means follows each determination of equality with a predetermined period of delay before generating a particular control signal.

6. A converter according to claim 5, wherein said delay period is approximately four milliseconds.

7. A converter according to claim 5, wherein said delay period is approximately 5.5 milliseconds.

* * * * *

UNITED STATES PATENT AND TRADEMARK OFFICE
CERTIFICATE OF CORRECTION

PATENT NO. : 4,481,456
DATED : November 6, 1984
INVENTOR(S) : Russell G. Meyerand, Jr.; Louis L. Daigle; Donald C. Paine It is certified that error appears in the above-identified patent and that said Letters Patent is hereby corrected as shown below:

Column 8, line 23    "menas" should read --means--

Column 8, line 38    "a suitable" should read --said--

Signed and Sealed this

Third Day of September 1985

[SEAL]

Attest:

DONALD J. QUIGG

Attesting Officer    Acting Commissioner of Patents and Trademarks - Designate